(12) United States Patent
Meierhofer et al.

(10) Patent No.: US 7,225,890 B2
(45) Date of Patent: Jun. 5, 2007

(54) CUTTING PLATE FOR A DRILL BIT

(75) Inventors: Markus Meierhofer, Passau (DE); Rainer Eggers, Büchlberg (DE)

(73) Assignee: Black & Decker Inc., Newark, DE (US)

( * ) Notice: Subject to any disclaimer, the term of this patent is extended or adjusted under 35 U.S.C. 154(b) by 177 days.

(21) Appl. No.: 10/914,881

(22) Filed: Aug. 10, 2004

(65) Prior Publication Data

US 2005/0126829 A1 Jun. 16, 2005

(30) Foreign Application Priority Data

Aug. 12, 2003 (GB) ................................ 0318851.3

(51) Int. Cl.
*E21B 10/36* (2006.01)
*E21B 10/44* (2006.01)

(52) U.S. Cl. .................. 175/415; 175/420; 175/420.1; 175/395; 175/426

(58) Field of Classification Search ................ 175/415, 175/398, 412, 420, 420.1, 394, 395, 426, 175/427, 428, 430
See application file for complete search history.

(56) References Cited

U.S. PATENT DOCUMENTS

| 2,877,985 | A | * | 3/1959 | Petersen | 175/392 |
| 2,888,247 | A | * | 5/1959 | Wilhelm | 175/379 |
| 2,973,047 | A | * | 2/1961 | Stanley et al. | 175/420.1 |
| 4,440,246 | A | * | 4/1984 | Jurgens | 175/430 |
| 4,538,690 | A | * | 9/1985 | Short, Jr. | 175/430 |
| 4,951,761 | A | | 8/1990 | Peetz et al. | |
| 5,467,837 | A | * | 11/1995 | Miller et al. | 175/420.1 |
| 5,836,410 | A | | 11/1998 | Kleine | |
| 5,918,105 | A | | 6/1999 | Anjanappa et al. | |
| 6,446,741 | B1 | * | 9/2002 | Kersten et al. | 175/428 |
| 2004/0112647 | A1 | * | 6/2004 | Meierhofer | 175/323 |

FOREIGN PATENT DOCUMENTS

| CA | 1 236 083 | 5/1988 |
| DE | 298 19 388 U1 | 10/1999 |
| DE | 198 60 528 A2 | 7/2000 |

(Continued)

OTHER PUBLICATIONS

European Search Report dated Oct. 25, 2004.

*Primary Examiner*—David Bagnell
*Assistant Examiner*—Robert Fuller
(74) *Attorney, Agent, or Firm*—Harness, Dickey & Pierce, P.L.C.

(57) ABSTRACT

An auxiliary cutting plate (10) for a multi-cutting plate drill bit (2) has a body (44) for fixing into a slot in the drill bit (2) and a profiled tip (46). The body (44) has a central longitudinal axis and the profiled tip (46) protrudes from one end of the body (44). The profiled tip (46) has a cutting edge (62) defined by a transition between a rake face (64) and a relief face (66). The rake face (64) and the relief face (66) each slope axially rearward from opposite sides of the cutting edge (62). The angle of inclination θ of at least a portion of the rake face (64), measured from a plane perpendicular to the longitudinal axis, decreases with increasing distance from the cutting edge (62).

8 Claims, 6 Drawing Sheets

| | FOREIGN PATENT DOCUMENTS | |
|---|---|---|
| EP | 0 687 617 B1 | 1/2000 |
| EP | 1 134 355 A2 | 9/2001 |
| EP | 1 134 355 A3 | 3/2002 |
| EP | 1 273 372 A1 | 1/2003 |
| EP | 1 272 730 B1 | 10/2004 |
| JP | 2000107920 | 4/2000 |
| RU | 1470926 A1 | 4/1989 |
| ZA | 9610466 | 6/1997 |

* cited by examiner

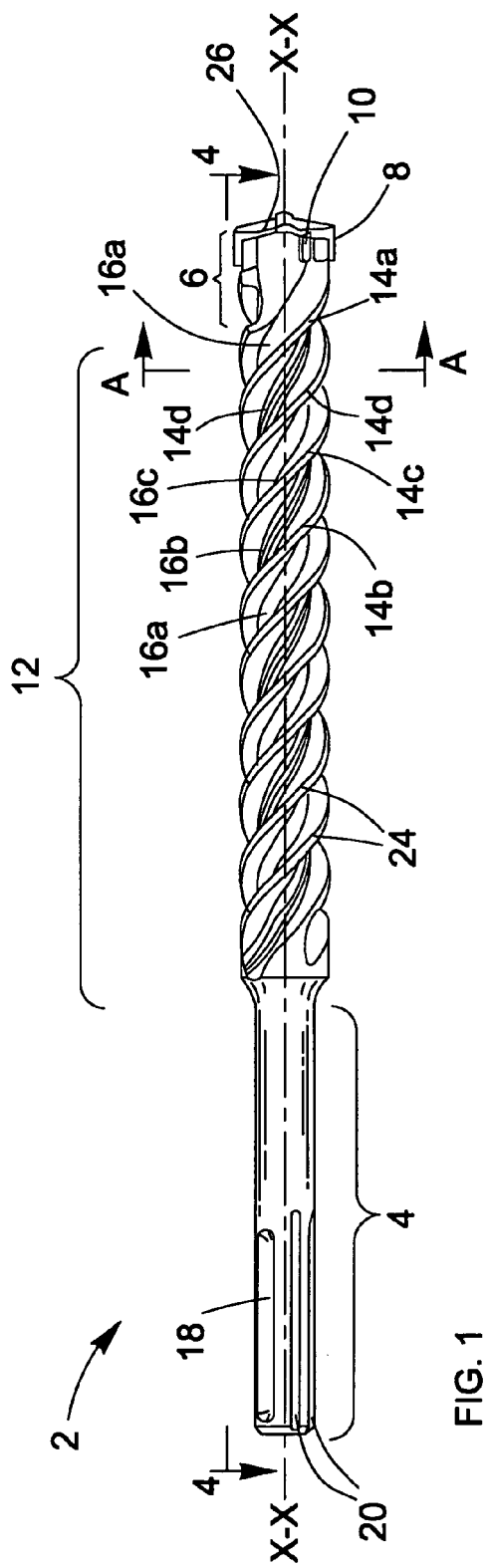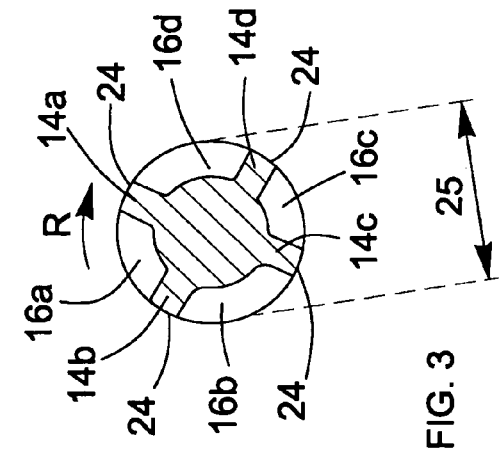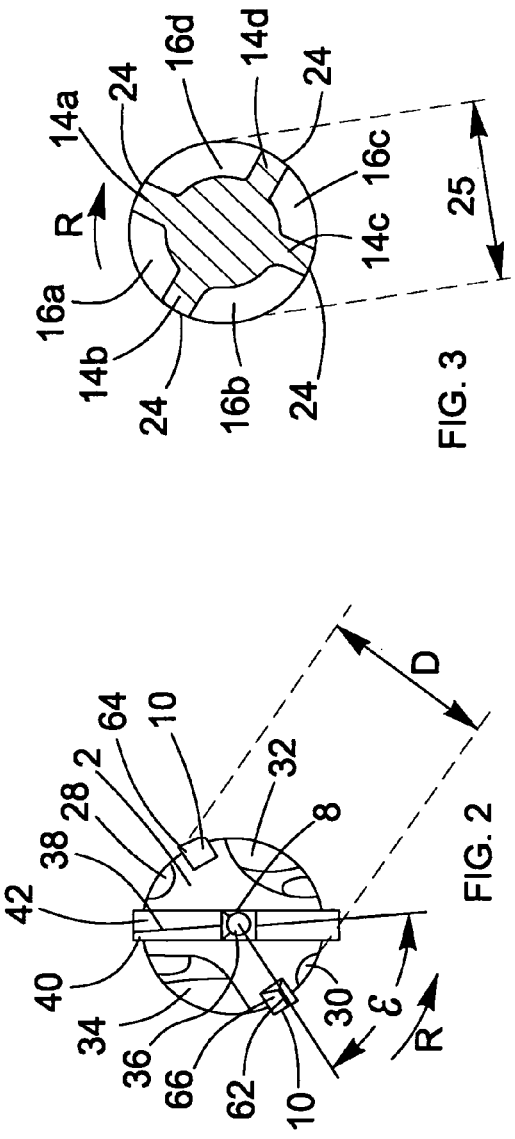

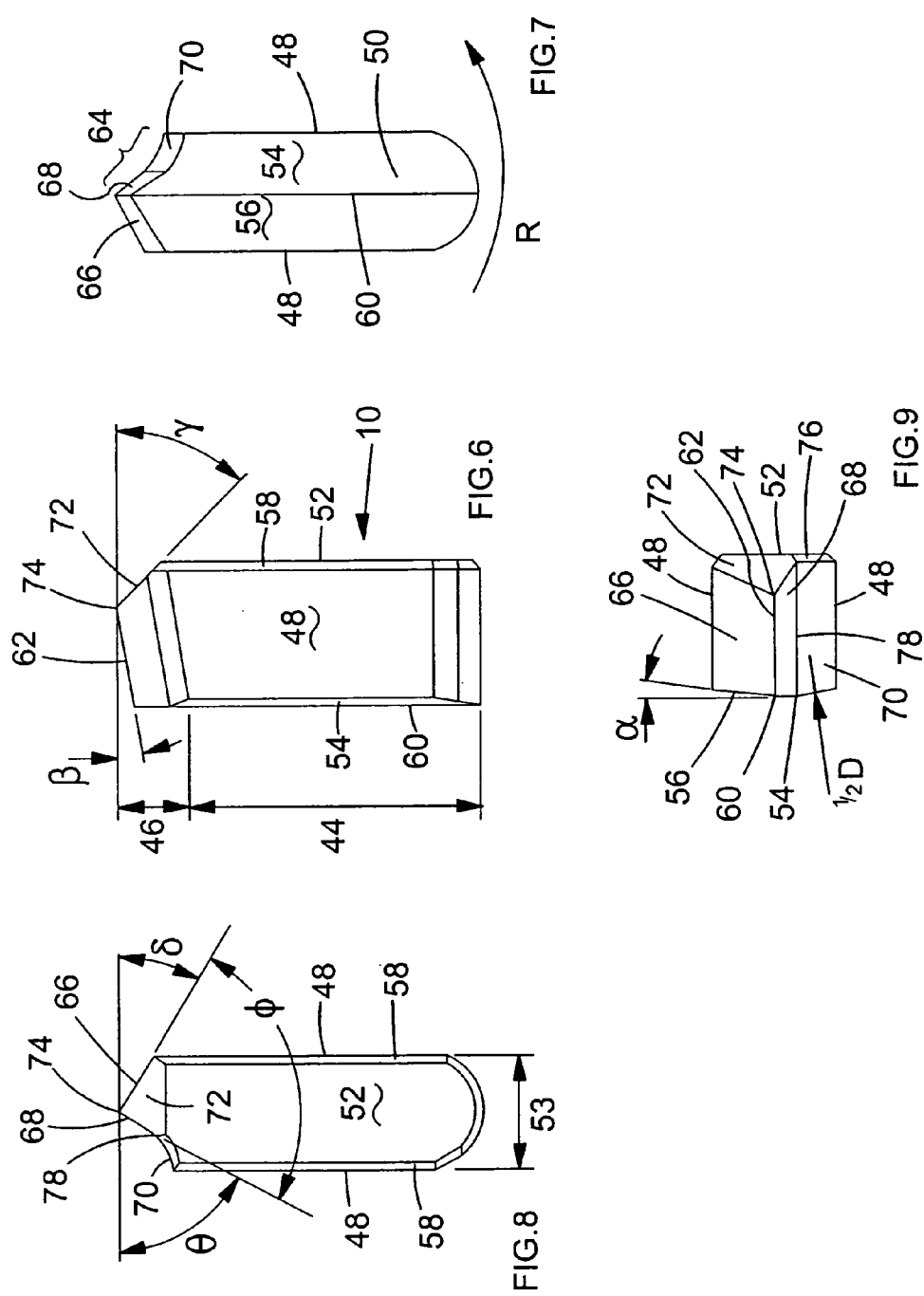

CUTTING PLATE FOR A DRILL BIT

CROSS-REFERENCE TO RELATED APPLICATIONS

This application claims priority to United Kingdom Patent Application No. GB 0318851.3 filed Aug. 12, 2003, which application is herein expressly incorporated by reference.

FIELD OF THE INVENTION

The present invention relates to a cutting plate for a drill bit and, more particularly, to an auxiliary cutting plate for a multi-cutting plate drill bit.

BACKGROUND OF THE INVENTION

In existing designs, cutting plates have a generally rectangular body with a profiled tip for cutting a workpiece, for example, masonry. The body is welded, brazed or fixed by other mechanical means to a drilling head located at one end of a shaft of a drill bit having a longitudinal axis. The profiled tip of the cutting plate protrudes axially from the drilling head. Located at the other end of the shaft is a shank to releasably connect to a tool holder or a drill or the like, for example, a rotary drill, a rotary percussion drill or a rotary hammer. The shaft also has a conveying flute extending axially rearward from the drilling head toward the shank end of the drill bit. The flute may be a single-start or multi-start, straight or helical flute or a combination thereof. The primary function of the flute is to convey debris broken by the cutting plate out of the hole drilled in a workpiece. In use, the shank of the drill bit is connected to and rotated by the tool holder while a percussive force is simultaneously applied to the shank in an axial direction. The rotary movement and the percussive force are both transmitted to the cutting plate which is in contact with a masonry workpiece. The percussive force transmitted to the rotating cutting plate helps it to drill a circular hole in the workpiece.

Commonly, masonry drill bits comprise a single cutting plate. The cutting plate's profiled tip has a pair of cutting edges extending radially outward from the drill bit's axis to the periphery of the drill bit's working diameter. Each cutting edge is defined by the transition between a leading rake face and a trailing relief face. Both the rake and the relief faces are flat and slope axially rearward from the cutting edge to give the cutting plate's profiled tip a roof-like shape. A conveying flute starts on each side of the cutting plate. A single cutting plate is satisfactory for masonry drill bits having a diameter up to approximately 16 mm. However, the performance of a single cutting plate becomes decreasingly satisfactory for masonry drill bits having a diameter over and above 16 mm. This is because, in use, the space swept by the cutting edges between impacts of the percussive force is significant at the periphery of a working diameter over and above 16 mm.

The impacts of the percussive force cause the radially orientated cutting edges to cut successive radial notches in the workpiece as the cutting plate rotates. This is part of, the normal process of drilling a hole in a masonry workpiece, however, substantial vibration occurs if these radial notches become too rough. The vibration propagates from the cutting plate along the shank of the drill bit and eventually to the user, via the power tool. This can be very uncomfortable for the user. Also, the rotational speed and the amount of material removed per revolution by the cutting edges is highest at the periphery of the working diameter. Also, frictional forces acting in that region can become intolerably high for such drill bits. Excessive frictional forces cause overheating, premature wear and damage to the cutting edges at the periphery of the working diameter. This destabilises the drill bit and impairs its ability to drill a clean hole in the workpiece, as well as shortening the lifespan of the drill bit. These problems are present in all masonry drill bits comprising a single cutting plate, however, they are more pronounced in masonry drill bits comprising a single cutting plate having a larger diameter.

These problems are addressed by providing masonry drill bits of larger diameter with at least one auxiliary cutting plate fixed to the drilling head at the periphery of the working diameter, in addition to the main cutting plate. Like the main cutting plate, each auxiliary cutting plate generally has a profiled tip with a cutting edge. The cutting edge is defined by the transition between a leading rake face and a trailing relief face. Both the rake and the relief faces are flat and slope axially rearward from the cutting edge to give the auxiliary cutting plate's profiled tip a roof-like shape. Often an additional conveying flute is required to start from each additional auxiliary cutting plate. Auxiliary cutting plates provide additional cutting edges which have the effect of smoothing the radial notches cut in the workpiece at the periphery of the working diameter to reduce the vibration propagating along the drill bit. The cutting edges of the auxiliary cutting plates also spread the frictional load more evenly around the periphery of the working diameter. This reduces the frictional load per unit length acting on the cutting edges of the main cutting plate to a tolerable level. This overcomes the problems identified above which results in drilling a cleaner hole in a workpiece, even one drilled in hard masonry material. The cutting edges of the auxiliary cutting plates also increase the speed at which the drill bit cuts a hole in a workpiece.

An example of a masonry drill bit with a main cutting plate and a single auxiliary cutting plate is disclosed by patent publication no. EP347602B. An example of a masonry drill bit having a main cutting plate and a pair of symmetrical auxiliary cutting plates is disclosed by patent publication no. EP687617B. The auxiliary cutting plates of both these disclosures have profiled tips with the common roof-like shape generated by the pairs of flat rake and relief faces sloping axially rearward from the cutting edges.

While auxiliary cutting plates do enhance the performance of drill bits of larger diameter, they are nonetheless additional components that add cost and complexity to the design and manufacture of drill bits. Such drill bits are not inexpensive and manufactures are keen to provide end users With a drill bit with a satisfactory life span. By its very nature, a drill bit is subject to wear and there comes a time when the cutting edges are blunted to the extent that drilling speed is impaired and the drill bit becomes obsolete and needs replacement.

Cutting plates made of hard composite materials like, for example, tungsten carbide have good wear characteristics. These extend the normal lifespan of masonry drill bits beyond that expected of hardened steels. As technology advances new composite materials for cutting plates are developed which are increasingly hard. These new materials are more expensive but this is justified by even better wear characteristics which make such new materials cost effective.

Wear on the cutting edges dictates the ultimate lifespan of a masonry drill bit; however, a chipped cutting edge or complete removal of a cutting plate can result in premature failure of the drill bit. In the case of cutting plates made from hard composite material, re-profiling of a chipped cutting edge is not possible. The only option is completely removing and replacing of the cutting plate. If the cutting plate is brazed or welded to the drilling head of the drill bit such a course of action will be costly and time consuming and will cause withdrawal of the drill bit from service. A spare drill bit will be needed to continue the job at hand, but only if the user has taken the precaution of keeping spares or has the financial means to do so. Otherwise, the job at hand will cease, which is undesirable. If the cutting plate has been completely removed during operation of the drill bit, which may not be immediately noticed, continued use of the drill bit may cause collateral damage to the drilling head. Drill bits are designed to withstand wear to the cutting plate and cutting edge but not wear and/or damage to the drilling head. Accordingly, inadvertent damage to the drilling head may be of the nature to cause premature failure of the entire drill bit. For these reasons, it is of utmost importance that drill bit are designed in a manner that reduces the likelihood of damage to the cutter plate and, in particular, complete removal of the cutting plate when the drill bit is in use.

Frequently, cutting plates are seated in a slot in the drilling head and fixed by brazing. In the case of a drill bit comprising a main cutting plate and at least one auxiliary cutting plate, it is the auxiliary cutting plate that mostly risks complete removal. This is because the main cutting plate is seated in a slot in the drilling head spanning the full working diameter, whereas each auxiliary cutting plate is seated in a narrow slot in the drilling head located at the periphery of the working diameter. Accordingly, the main cutting plate is brazed to the drilling head along its broadest lateral faces which provides greater adhesion than the auxiliary cutting plate, which is only brazed to the drilling head along narrow lateral faces and one side face. Further, frictional contact with the cutting face and the sidewall of the drilled hole creates shear forces that tend to pull a cutting plate radially outward from its slot. The main cutting plate spans the working diameter and thus any such radial forces are cancelled out. Whereas, only the brazed joint between the auxiliary cutting plate and its slot acts against such radial forces. Accordingly, it is of utmost importance that the auxiliary cutter's brazed joint is defect free. Otherwise, it will be prone to failure in use resulting in removal of the auxiliary cutting plate and the likely consequential damage to the drilling head mentioned above. This is something that preoccupies the mind of all drill bit designers who strive to find solutions to the problem of removal of auxiliary cutting plates in use.

SUMMARY OF THE INVENTION

The present invention overcomes, or at least mitigates, the removal problem of the auxiliary cutting plate in use while maintaining the auxiliary cutting plate's cutting performance.

According to the present invention, an auxiliary cutting plate is provided for a multi-cutting plate drill bit. The auxiliary cutting plate comprises a body to fix into a slot in the drill bit and a profiled tip. The body has a central longitudinal axis. The profiled tip protrudes from one end of the body. The profiled tip comprises a cutting edge defined by a transition between a rake face and a relief face. The rake face and the relief face each slope axially rearward from opposite sides of the cutting edge. The angle of inclination of at least a portion of the rake face, measured from a plane perpendicular to the longitudinal axis, decreases with increasing distance from the cutting edge.

According to the invention, an auxiliary cutting plate is provided for a multi-cutting plate drill bit. The auxiliary cutting plate comprises a body to fix into a slot in the drill bit and a profiled tip. The body has a central longitudinal axis. The profiled tip protrudes from one end of the body. The profiled tip comprises a cutting edge defined by a transition between a rake face and a relief face. The rake face and the relief face each slope axially rearward from opposite sides of the cutting edge toward the body. The angle of inclination of the rake face, measured from a plane perpendicular to the longitudinal axis, is greater at the cutting edge than at a point at which the cutting edge meets the body.

The decrease in inclination of the rake face can be in discreet steps or a continuous decrease, or a combination of both. This arrangement of the rake face results in an auxiliary cutting plate which is wider than the common roof-shaped auxiliary cutting plate, without causing the profiled tip to protrude further from the body any more than is strictly necessary and without compromising on the optimum angle of the cutting edge. The auxiliary cutting plate according to the present invention has a greater surface area to attach to the slot of the drilling head. This reduces the likelihood of the auxiliary cutting plate being removed from the drill bit during use. Also, the auxiliary cutting plate according to the present invention is less likely to be chipped or damaged during use because the protrusion of the profiled tip from the body is limited to no more than strictly necessary to perform the task of cutting a workpiece.

Preferably, the rake face comprises a concave curvilinear portion which gradually reduces the inclination of the rake face. A curvilinear portion is well suited to the sintering process commonly used to manufacture cutting plates because of its smoothness. In addition to the concave curvilinear portion, the rake face may comprise at least one flat portion trailing and/or leading the curvilinear portion in the direction of slope away from the cutting edge. Alternatively, the rake face may comprise a plurality of flat portions following a concave curved path.

Further areas of applicability of the present invention will become apparent from the following detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a side elevation view of a drill bit;

FIG. 2 shows an end elevation view of the drill bit of FIG. 1;

FIG. 3 shows a radial cross-section 3—3 of the drill bit of FIG. 1;

FIG. 6 shows a front elevation view of an auxiliary cutting plate;

FIG. 7 shows a side elevation view of the auxiliary cutting plate of FIG. 6 viewed from one side;

FIG. 8 shows a side elevation view of the auxiliary cutting plate of FIG. 6 view from the opposite side; and FIG. 9 shows a plan view of the auxiliary cutting plate of FIG. 6.

DETAILED DESCRIPTION OF THE PREFERRED EMBODIMENTS

Figure 4:
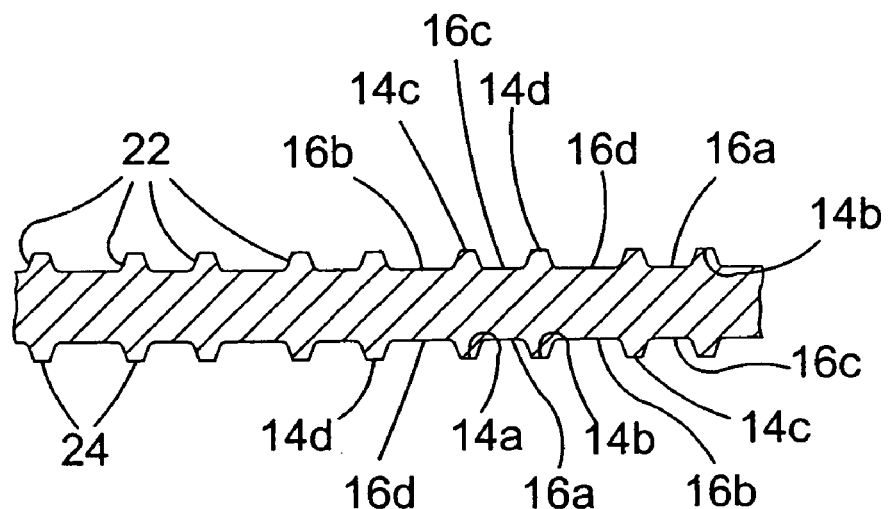
FIG. 4 shows a cross-section along a longitudinal axis 4—4 of the drill bit of FIG. 1.
Figure 5:
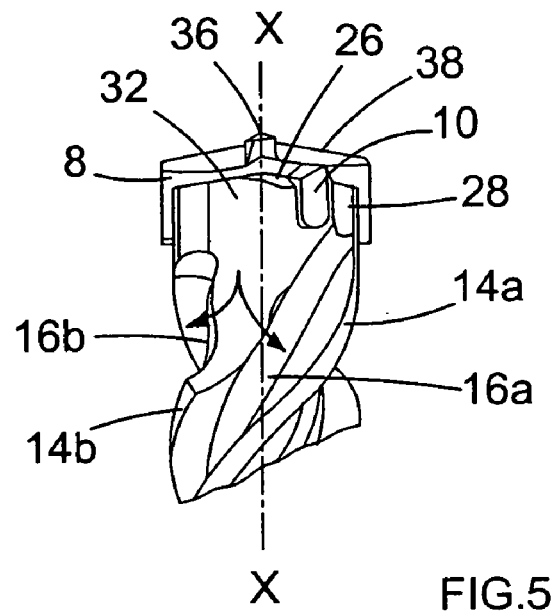
FIG. 5 shows a side elevation view of the drilling head of the drill bit of FIG. 1.

The following description of the preferred embodiment(s) is merely exemplary in nature and is in no way intended to limit the invention, its application, or uses.

FIGS. 1 to 5 show a design of a drill bit 2 having a diameter of between 16 mm and 52 mm. The drill bit has a longitudinal axis X—X. The drill bit 2 has a clamping shank 4 at its rear end that can be releasably fitted within a tool holder of a rotary hammer. The drill bit 2 has a drilling head 6 at its forward end within which are mounted a carbide primary cutting plate 8 and a pair of auxiliary carbide cutting plates 10. The tool has an intermediate helical conveying portion 12 extending between the shank 4 and the drilling head 6 around which extend four helical webs 14a–14d and corresponding helical flutes 16a–16d.

The shank 4 of the drill bit shown in FIG. 1 is configured as a SDS-Max clamping shank 4, as is well known in the art. The shank 4 comprises a pair of opposing axially closed grooves 18. Locking elements of a tool holder of a rotary hammer are generally received in the grooves to enable limited reciprocation of the drill bit with respect to the tool holder. In addition, the shank 4 is formed with three axially extending slots 20. The slots 20 are each open at their rear end which terminates at the rear end of the shank 4. Two of the three open slots 20 are shown in FIG. 1. The third slot is not shown but is formed on the opposite side of the shank 4 to the two slots shown. When the drill bit is fitted within a tool holder of a rotary hammer, corresponding splines formed on the tool holder engage in the open slots 20 to transmit rotary drive from the tool holder to the drill bit.

The conveying helical portion 12 of the drill bit comprises four discharge grooves or flutes 16a–16d which extend helically around the drill bit. Each of the flutes 16a–16d is bounded on each side by a corresponding helically extending web 14a–14d. Each web has a conveying surface 22 which faces in the direction of the shank 4 of the drill bit and extend in a direction substantially perpendicular to the axis X—X of the drill bit, along which broken material is conveyed. A radially outwardly facing land 24 of the each webs guides the drill bit within the drilled hole and define the outer circumference 25 of the helical conveying portion 12 of the drill bit 2.

The drilling head is best understood from FIG. 2. The drilling head is formed with a transverse slot within which a carbide primary cutting plate 8 is fixed, for example, by braising. The primary cutting plate 8 extends axially beyond a forward facing face 26 of the drilling head 6. The primary cutting plate 8 also extends radially beyond both ends of the transverse slot in the drilling head 6.

The two portions of the drilling head 6 trailing the primary cutting plate 8 in the direction of rotation R are each formed with a concave axially extending secondary channel 28,30. The secondary channels 28,30 extend from the forward face 26 of the drilling head to an entrance of a respective flute 16a, 16c.

The two portions of the drilling head 6 trailing the secondary channels 28,30 in the direction of rotation R are formed with substantially radially extending slots. The slots are open at their radially outer end and closed at their radially inner end. An auxiliary cutting plate 10 is fitted, for example by braising, into each slot. The auxiliary cutting plates 10 extend radially outwardly to nearly the same working diameter D as the primary cutting plate 8. The auxiliary cutting plates 10 are slightly axially recessed with respect to the primary cutting plate 8. Each auxiliary cutting plate 10 trails the primary cutting plate 8 in the direction of rotation R by an angle $\epsilon$ of approximately 54°.

The two portions of the drilling head trailing the auxiliary plates 10 in the direction of rotation R are each formed with a concave axially extending primary channel 32,34. One of the primary channels 32 extends from the forward facing face 26 of the drilling head to the entrance of two of the four flutes 16a, 16b. The other primary channel 34 extends from the forward facing face 26 of the drilling head to the entrance to the remaining two of the four flutes 16c, 16d. Each primary channel 32,34 is of sufficient cross-section to efficiently convey broken material from the forward face 26 of the drilling head to the entrances of two of the four flutes of the drill bit. The concave shape of the primary channels 32,34 provides high volume removal of broken material while maintaining the strength of the drilling head. The primary channels 32,34 have radially outwardly facing surfaces which are parallel to the longitudinal axis X—X of the drill bit.

The chiselling surface of the primary cutting plate 8 is formed by a central dome 36 formed as a smooth elliptical projection which is positioned to coincide with the axis of the X—X of the drill bit 2. A cutting edge 38 extends radially outwardly from each side of the dome 36 along the two halves of the primary cutting plate 8. In each half of the primary cutting plate 8, the cutting edge 38 defines a boundary between a rake face 40 and a trailing relief face 42. The rake face 40 slopes axially rearward from the cutting edge 38 in the direction of rotation R. The relief face 42 slopes axially rearward from the cutting edge 38 opposite to the direction of rotation R.

FIGS. 6 to 9 show in more detail the design of the auxiliary cutting plates 10 according to one embodiment of the present invention. Each of the cutting plates 10 comprises a generally rectangular body 44 having a central longitudinal axis and a profiled tip 46. The body 44 is seated in, and braised to, the slot in the drilling head 6. The body 44 and its longitudinal axis are parallel to the axis X—X of the drill bit 2 in FIGS. 6 to 9. The profiled tip 46 extends axially forward from the forward facing face 26 when the body 44 is seated in the slot of the drilling head 6.

The body 44 has a pair of parallel lateral faces 48 interposed on one side by an outer side face 50 and on the other side by a flat inner side face 52. The lateral faces 48, the outer side face 50, and the inner side face 52 are all parallel to the central longitudinal axis of the body 44 and the axis X—X of the drill bit 2. The inner side face is perpendicular to the lateral side faces and faces towards the axis X—X. The depth of the body is a distance 53 between the lateral faces 48. The outer side face faces away from the axis X—X and has a convex curvilinear portion 54 and a flat portion 56. The radius of the convex curvilinear portion 54 is approximately equal to half the working diameter D of the primary cutting plate 8. Thus, the convex curvilinear portion 54 smoothly contacts the curvilinear surface of a hole drilled in a workpiece. The convex curvilinear portion 54 and the flat portion 56 intersect at an axially parallel outer edge 60. The flat portion 56 slopes radially inwardly from the outer edge 60 opposite to the direction of rotation R to create relief behind the outer edge 60. The flat portion 56 is inclined by an angle α of approximately 10° measured from a plane perpendicular to the lateral faces 48 and containing the outer edge 60. Also, there exists a flat side chamfer 58 at the transition between the inner side face 52 and each lateral side face 48 of the body 44.

A cutting edge 62 extends substantially parallel to the lateral faces 48 across the majority of the width of the profiled tip 46. The cutting edge 62 is defined by the transition between a leading rake face 64 and a trailing relief face 66. The rake face 64 slopes axially rearward from the cutting edge 62 in the direction of rotation R. The relief face 66 slopes axially rearward from the cutting edge 62 opposite to the direction of rotation R. The relief face 66 is flat. The rake face 64 comprises a flat portion 68 led, in the direction of rotation R, by a concave curvilinear portion 70.

A generally triangular flat top chamfer 72 is located between the cutting edge 62 and the inner side face 52. The top chamfer 72 is also bounded by the flat portion 68 of the rake face 64 and the relief face 66. The transition between the cutting edge and the top chamfer forms the apex 74 of the auxiliary cutting plate 10. The cutting edge 62 slopes axially rearwardly from the apex 74 towards the outer side face 50. The cutting edge 62 is inclined by an angle β of approximately 9° measured from a plane perpendicular to the axis X—X. The rake face 64 and the relief face 66 are parallel to the cutting edge 62 and are also inclined by the angle β. The top chamfer 72 slopes axially rearwardly from the apex 74 towards the inner side face 52. The top chamfer 62 is inclined by an angle γ of approximately 45° measured from a plane perpendicular to the axis X—X.

A rake chamfer 76 is located between the curvilinear portion 70 of the rake face 64 and the inner side face 52 of the body 44. The rake chamfer 76 also forms the transition between the top chamfer 72 and the side chamfer 58. The purpose of the top chamfer 72 is to reduce the sharpness of the cutting edge 62 in the region of the apex 74. Likewise, the purpose of the rake chamfer 76 is to reduce the sharpness of the transition region between the inner side face 52 and curvilinear portion 70 of the rake face 64. Reduction in the sharpness of these two relatively exposed regions of the profiled tip 46 reduces the possibility of catastrophic damage like, for example, chipping of the auxiliary cutting plate 10.

Referring to FIGS. 7 and 8, as mentioned above, the relief face 66 slopes axially rearward from the cutting edge 62 opposite to the direction of rotation R. The relief face is inclined by an angle δ of approximately 30° measured from a plane perpendicular to the axis X—X. Also, the flat portion 68 of the rake face 64 slopes axially rearward from the cutting edge 62 in the direction of rotation R until it meets the curvilinear portion 70 of the rake face 64 at a transition line 78. The flat portion 68 is inclined by an angle θ of approximately 60° measured from a plane perpendicular to the axis X—X. Accordingly, the cutting edge 62 has a cutting edge angle φ of approximately 90° (i.e. φ=180°−(δ+θ)). This angle corresponds to the optimum cutting edge angle for such an auxiliary cutting plate. The concave curvilinear portion 70 continues in the direction of rotation R from the transition line 78. The angle of inclination θ of the concave curvilinear portion 70 (measured from a plane perpendicular to the axis X—X) gradually decreases towards 0° as the concave curvilinear portion approaches an adjacent lateral face 48. The curvilinear portion 70 increases the depth 53 of the auxiliary cutting plate 10 without resulting in an increase in the cutting edge angle φ or an increase in the height of the profiled tip 46.

Figure 10:
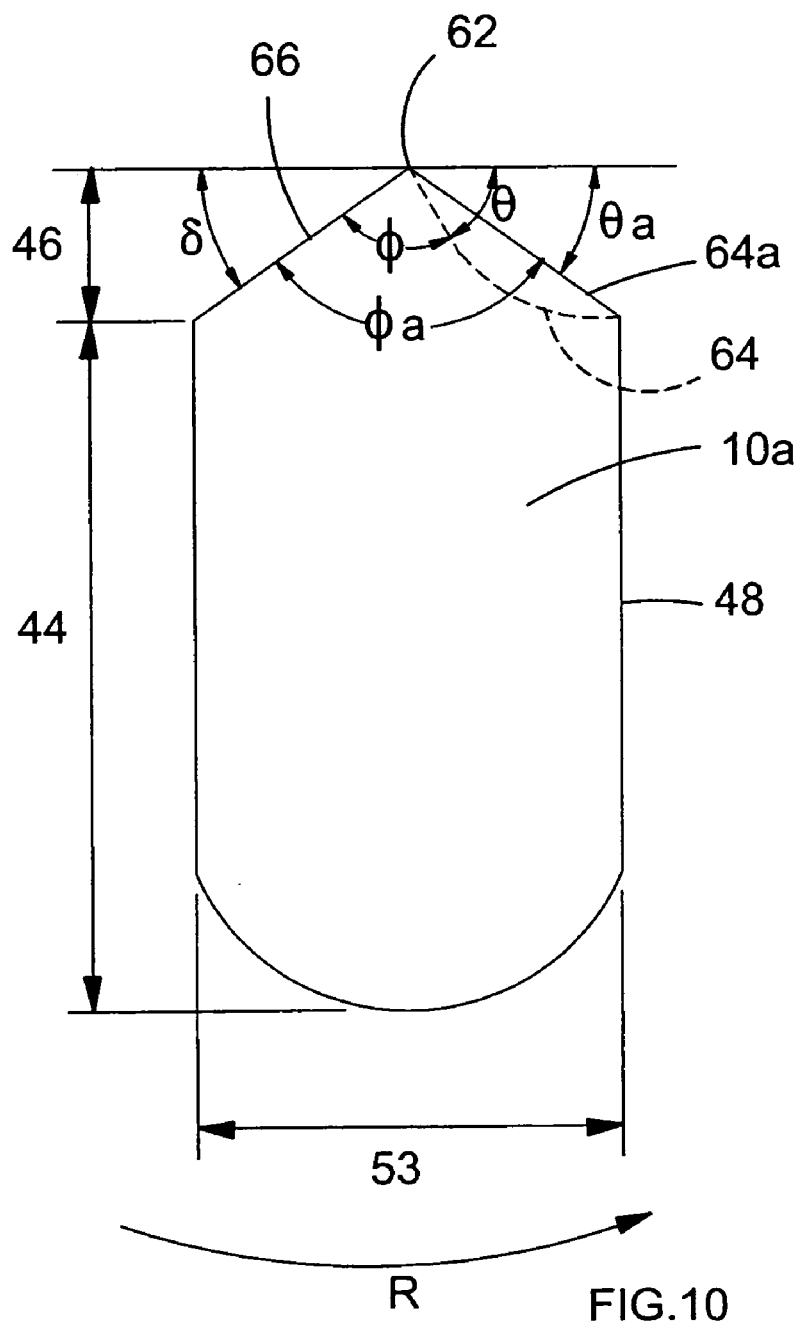
FIG. 10 shows a side cross-sectional view of a first alternative auxiliary cutting plate compared with the auxiliary cutting plate of FIG. 6.
Figure 11:
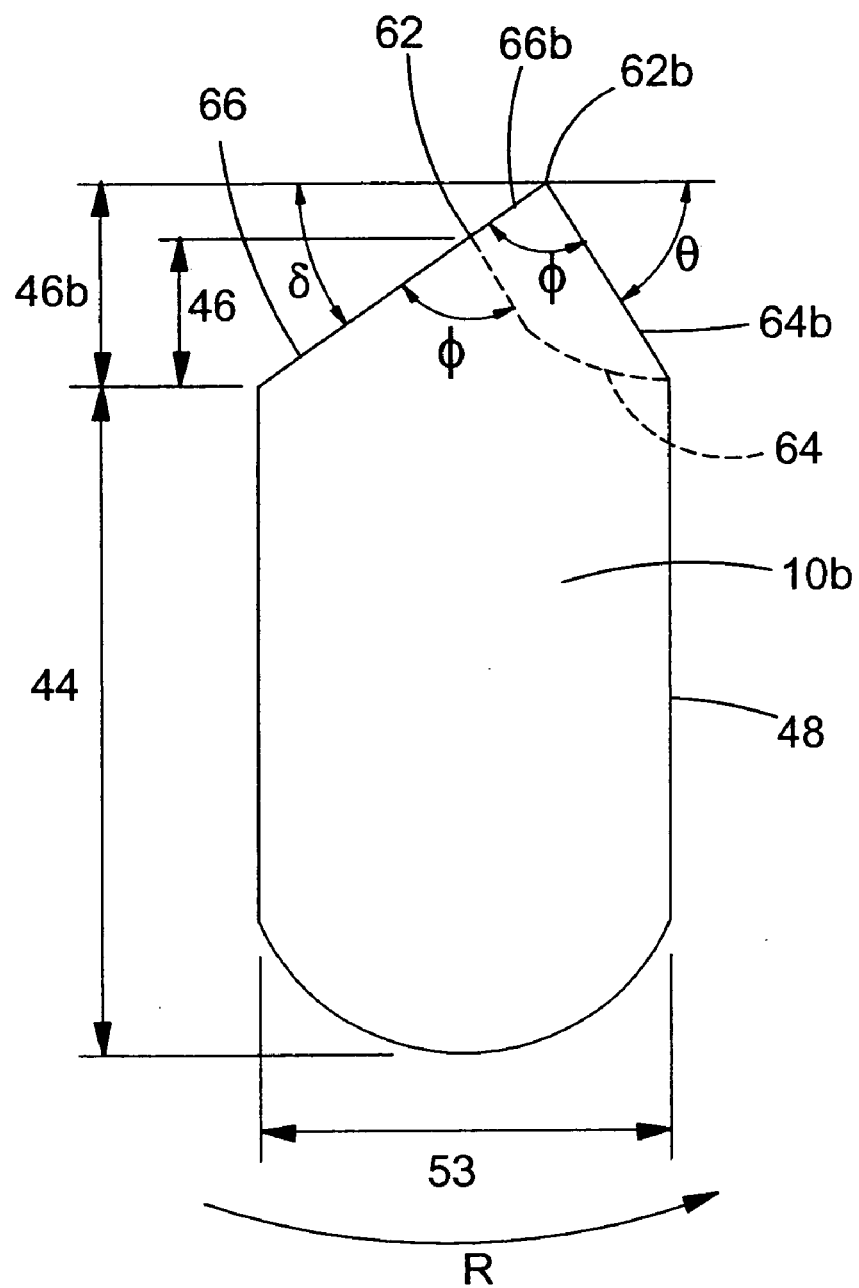
FIG. 11 shows a side cross-sectional view of a second alternative auxiliary cutting plate compared with the auxiliary cutting plate of FIG. 6.
Figure 12:
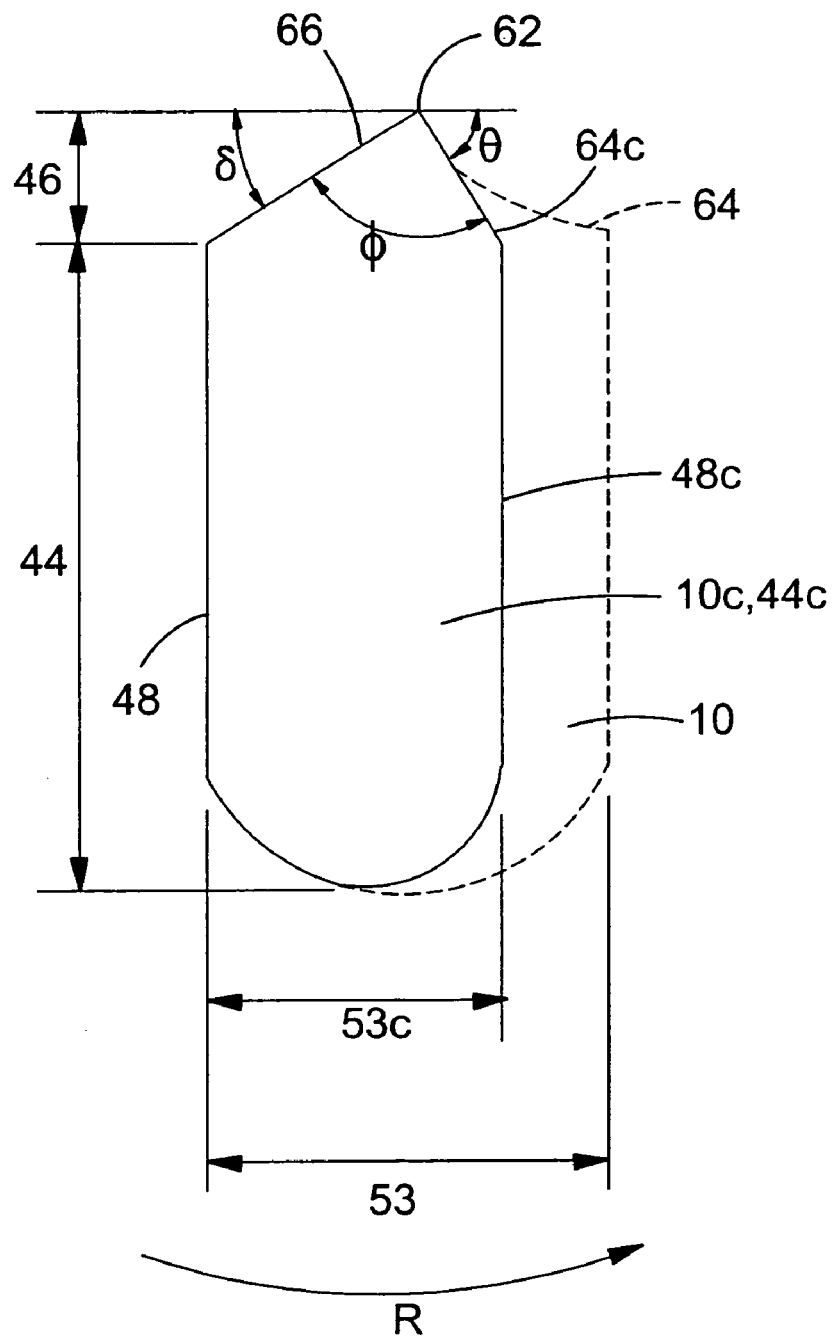
FIG. 12 shows a side cross-sectional view of a third alternative auxiliary cutting plate compared with the auxiliary cutting plate of FIG. 6.

FIGS. 10 to 12 represent a comparison between the auxiliary cutting plate 10 and three other alternative designs of auxiliary cutting plate 10a, 10b, 10c. The three alternative designs of auxiliary cutting plates 10a, 10b, 10c all have the common roof-shaped profiled tip mentioned above. The outline of the auxiliary cutting plate 10 is shown in dashed lines only where it differs from the outline of an alternative cutting plate 10a, 10b, 10c. The body 44 and its longitudinal axis are parallel to the axis X—X of the drill bit 2 shown in FIGS. 10 to 12. As mentioned above, the auxiliary cutting plate 10 has an optimum cutting edge angle φ. A cutting edge angle which is significantly greater than angle φ dulls the cutting edge 62 and reduces the ability of the auxiliary cutting plate 10 to cut into a workpiece. Conversely, a cutting edge angle significantly smaller than angle φ sharpens the cutting edge 62 to the extent of making it brittle and prone to chipping. This potentially reduces the life span the auxiliary cutting plate 10. Accordingly, a drill bit designer will keep the cutting edge angle as close as possible to optimum angle φ.

Referring in particular to FIG. 10, first alternative auxiliary cutting plate 10a is shown. Cutting plate 10a comprises a flat rake face 64a between the relief face 66 and an adjacent lateral face 48. The flat rake face 64a follows a direct path between the cutting edge 62 and the top of the lateral face 48. In contrast, the rake face 64 of the auxiliary cutting plate 10 follows the dashed line path of the flat portion leading to the concave curvilinear portion. The rake face 64 links the same points as the rake face 64a because the height of the profiled tip 46 and the depth 53 are the same for both the auxiliary 10 and first alternative auxiliary 10a cutting plates. However, the flat portion of the rake face 64 is more steeply inclined than the flat rake face 64a. This is shown by the angle of inclination θ of the flat portion 68 which is greater than the corresponding angle θa of the flat rake face 64a. The angle δ of inclination of the relief face 66 is the same for both the auxiliary 10 and first alternative auxiliary 10a cutting plates. The cutting edge angle φa of the first alternative auxiliary cutting plate 10a is therefore greater than angle φ. The flat rake face 64a maintains the depth 53 of the first alternative auxiliary cutting plate 10a to the detriment of the cutting edge angle φa which is significantly greater than the optimum cutting edge angle φ.

Referring in particular to FIG. 11, a second alternative auxiliary cutting plate 10b is shown. Cutting plate 10b comprises a flat rake face 64b between an extended relief face 66b and an adjacent lateral face 48. The extended relief face 66b extends beyond the relief face 66 of the auxiliary cutting plate 10. Likewise, the profiled tip 46b of the second alternative auxiliary cutting plate 10b extends beyond the profiled tip 46 of the auxiliary cutting plate 10. This enables the flat rake face 64b to follow a direct path between the cutting edge 62b of the second alternative auxiliary cutting plate 10b and the top of the adjacent lateral face 48 without altering the cutting edge angle φ or the depth 53 of the first alternative auxiliary cutting plates 10a from that of the auxiliary cutting plate 10. In contrast, the rake face 64 of the auxiliary cutting plate 10 follows the dashed line path of the flat portion leading to the curvilinear portion.

The second alternative auxiliary cutting plate 10b maintains the optimum cutting edge angle φ and the adequate depth 53. But this is to the detriment of the profiled tip 46b which protrudes further from the body 44 than the profiled tip 46 of the auxiliary cutting plate 10. Accordingly, the profiled tip 46b and the cutting edge 62b are more exposed and therefore more prone to chipping or complete removal of the second auxiliary cutting plate 10b from the slot of the drilling head 6.

Referring in particular to FIG. 12, a third alternative auxiliary cutting plate 10c is shown. Cutting plate 10c comprises a flat rake face 64c between the relief face 66 and an adjacent lateral face 48c. The depth 53c of the third alternative auxiliary cutting plate 10c is smaller than the depth 53 of the auxiliary cutting plate 10. Thus, the lateral face 48c is closer to the lateral face 48 on the other side of the third alternative auxiliary cutting plate 10c. This enables the flat rake face 64c to follow a direct path between the cutting edge 62 and the lateral face 48c without altering the cutting edge angle $\phi$ from that of the auxiliary cutting plate 10. In contrast, the rake face 64 of the auxiliary cutting plate 10 follows the path of the flat portion leading into the curvilinear portion.

The third alternative auxiliary cutting plate 10c maintains the optimum cutting edge angle $\phi$ and adequate height of the profiled tip 46. But this is to the detriment of the depth 53c which causes the body 44c of the third alternative auxiliary cutting plate 10c to be thinner than the body 44 of the auxiliary cutting plate 10. Accordingly, the body 44c presents less surface area for fixing to the slot of the drilling head 6 and is more prone to being removed during usage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An auxiliary cutting plate for a multi-cutting plate drill bit, the auxiliary cutting plate comprising:
    an overall rectangular shaped body for fixing into a slot in the drill bit and a profiled tip, said body having a pair of lateral faces and an inner and outer side face, said inner side face being substantially flat for abutting a portion of the drill bit, said outer face having a surface different from said inner face for transitioning with an outer surface of the drill bit;
    said body has a central longitudinal axis and the profiled tip protrudes from one end of the body, said profiled tip comprises a cutting edge defined by a transition between a rake face and a relief face extended from their respective lateral faces, said rake face and the relief face each slope axially rearward from opposite sides of the cutting edge to said lateral faces, an angle of inclination $\theta$ of at least a portion of the rake face measured from a plane perpendicular to the longitudinal axis decreases with increasing distance from the cutting edge.

2. The auxiliary cutting plate according to claim 1, wherein the rake face comprises at least one concave curvilinear portion.

3. The auxiliary cutting plate according to claim 2, wherein the rake face comprises at least one flat portion.

4. The auxiliary cutting plate according to claim 1, wherein the rake face comprises a plurality of flat portions followed by a concave curved path.

5. An auxiliary cutting plate for a multi-cutting plate drill bit, the auxiliary cutting plate comprising
    an overall rectangular shaped body for fixing into a slot in the drill bit and a profiled tip, said body having a pair of lateral faces and an inner and outer side face, said inner side face being substantially flat for abutting a portion of the drill bit, said outer face having a surface different from said inner face for transitioning with an outer surface of the drill bit;
    said body has a central longitudinal axis and the profiled tip protrudes from one end of the body, said profiled tip comprises a cutting edge defined by a transition between a rake face and a relief face extended from their respective lateral faces, said rake face and the relief face each slope axially rearward from opposite sides of the cutting edge to said lateral faces toward the body, an angle of inclination $\theta$ of the rake face measured from a plane perpendicular to the longitudinal axis is greater at the cutting edge than at the point at which the cutting edge meets the body.

6. The auxiliary cutting plate according to claim 5, wherein the rake face comprises at least one concave curvilinear portion.

7. The auxiliary cutting plate according to claim 6, wherein the rake face comprises at least one flat portion.

8. The auxiliary cutting plate according to claim 5, wherein the rake face comprises a plurality of flat portions followed by a concave curved path.

* * * * *